US006486254B1

(12) United States Patent
Barbee et al.

(10) Patent No.: US 6,486,254 B1
(45) Date of Patent: Nov. 26, 2002

(54) COLORANT COMPOSITION, A POLYMER NANOCOMPOSITE COMPRISING THE COLORANT COMPOSITION AND ARTICLES PRODUCED THEREFROM

(75) Inventors: Robert Boyd Barbee, Kingsport, TN (US); Max Allen Weaver, Kingsport, TN (US); James Christopher Matayabas, Jr., Chandler, AZ (US)

(73) Assignee: University of South Carolina Research Foundation, Columbia, SC (US)

( * ) Notice: Subject to any disclaimer, the term of this patent is extended or adjusted under 35 U.S.C. 154(b) by 0 days.

(21) Appl. No.: 09/452,317

(22) Filed: Dec. 1, 1999

Related U.S. Application Data
(60) Provisional application No. 60/111,321, filed on Dec. 7, 1998.

(51) Int. Cl.$^7$ ................................................ C08K 3/34
(52) U.S. Cl. ........................ 524/445; 428/333; 428/338; 428/339; 523/210; 524/446; 524/447
(58) Field of Search ................................ 428/333, 338, 428/339; 501/248; 523/210; 524/445, 446, 447

(56) References Cited

U.S. PATENT DOCUMENTS

| | | |
|---|---|---|
| 2,531,427 A | 11/1950 | Hauser |
| 2,737,517 A | 3/1956 | Boyd |
| 2,924,609 A | 2/1960 | Joyce |
| 2,938,914 A | 5/1960 | Joyce |
| 2,957,010 A | 10/1960 | Straley et al. |
| 2,966,506 A | 12/1960 | Jordan |
| 3,076,821 A | 2/1963 | Hoare |
| 3,125,586 A | 3/1964 | Katz et al. |
| 3,232,934 A | 2/1966 | Hoare |
| 3,281,434 A | 10/1966 | Turetzky et al. |
| 3,391,164 A | 7/1968 | Straley et al. |
| 3,499,916 A | 3/1970 | Berthold |
| 3,514,498 A | 5/1970 | Okazaki et al. |
| 3,544,523 A | 12/1970 | Maxion |
| 3,627,625 A | 12/1971 | Jarrett |
| 3,646,072 A | 2/1972 | Shaw |
| 3,700,398 A | 10/1972 | Cole, Jr. |
| 3,792,969 A | 2/1974 | Gertisser |
| 3,823,169 A | 7/1974 | Staub |
| 3,843,479 A | 10/1974 | Matsunami et al. |
| 3,849,406 A | * 11/1974 | Basel et al. ............ 260/239.7 |
| 3,876,552 A | 4/1975 | Moynihan |
| 3,879,283 A | 4/1975 | Mercade |
| 3,946,089 A | 3/1976 | Furukawa et al. |
| 4,018,746 A | 4/1977 | Brinkmann et al. |
| 4,064,112 A | 12/1977 | Rothe et al. |
| 4,071,503 A | 1/1978 | Thomas et al. |
| 4,081,496 A | 3/1978 | Finlayson |
| 4,105,578 A | 8/1978 | Finlayson et al. |
| 4,116,866 A | 9/1978 | Finlayson |
| 4,133,802 A | 1/1979 | Hachiboshi et al |

(List continued on next page.)

FOREIGN PATENT DOCUMENTS

| | | |
|---|---|---|
| DE | 3806548 | 9/1988 |
| DE | 3808623 | 10/1988 |
| EP | 186456 | 7/1986 |
| EP | 0202532 | 11/1986 |
| EP | 261430 | 3/1988 |
| EP | 278403 | 8/1988 |
| EP | 295336 | 12/1988 |
| EP | 398551 | 11/1990 |
| EP | 459472 | 12/1991 |
| EP | 542266 | 5/1993 |
| EP | 0590263 | 4/1994 |
| EP | 650994 | 5/1995 |
| EP | 0691212 | 1/1996 |
| EP | 0691376 | 1/1996 |
| EP | 681990 | 11/1996 |
| EP | 747451 | 12/1996 |
| EP | 0761739 | 3/1997 |
| EP | 780340 | 6/1997 |
| EP | 846723 | 6/1998 |
| EP | 0846723 | 6/1998 |
| EP | 0 899 301 A1 | 3/1999 |
| EP | 0 909 787 A1 | 4/1999 |

(List continued on next page.)

OTHER PUBLICATIONS

LeBaron et al., "Polymer–Layered silicate nanocomposites: an overview," *App. Clay Sci.*, 15, 11–29 (1999).
Ke et al., "Crystallization, Properties, and Crystal and Nanoscale Morphology of PET–Clay Nanocomposites," *J. Appl. Polym. Sci.*, 71, 1139–1146 (1999).
Kawasumi et al., "Preparation and Mechanical Properties of Polypropylene–Clay Hybrids," *Macromolecules*, 30, 6333–6338 (1997).
Usuki et al., "Synthesis of Propylene–Clay Hybrid", *J.Appl. Polym. Sci.*, 63, 137–139 (1997).
Giannelis, "Polymer Layered Silicate Nanocomposites," *Advanced Materials*, 8, 29–35 (1996).
Kurowaka et al., "Preparation of a nanocomposite of polypropylene and smectite," *J. Materials Science Letters*, 15, 1481–1483 (1996).
Oriakhi et al., "Incorporation of poly(acrylic acid), pol(vinylsulfonate) and poly(Styrenesulfonate) within layered double hydroxides," *J. Mater. Chem.*, 6, 103–107 (1996).
Messersmith et al.,"Syntheses and Barrier Properties of Poly(ε–Caprolactone)–Layered Silicate Nanocomposites," *J. of Polym. Sci.*, 33, 1047–1057 (1995).

(List continued on next page.)

*Primary Examiner*—Edward J. Cain
(74) *Attorney, Agent, or Firm*—Troutman Sanders LLP; Todd Deveau

(57) ABSTRACT

This invention relates to a colorant composition comprising a layered clay material intercalated with at least one cationic colorant, optical brightener or a mixture thereof. This invention also relates to a polymer-clay nanocomposite comprising (i) a melt-processible matrix polymer, and (ii) a layered clay material intercalated with at least one cationic colorant, optical brightener or a mixture thereof, wherein the clay-cation colorant/optical brightener intercalate is incorporated into the matrix polymer. The invention further relates to articles produced from the polymer nanocomposite.

55 Claims, No Drawings

U.S. PATENT DOCUMENTS

| | | |
|---|---|---|
| 4,161,578 A | 7/1979 | Herron |
| 4,163,002 A | 7/1979 | Pohl et al. |
| 4,208,218 A | 6/1980 | Finlayson |
| 4,219,527 A | 8/1980 | Edelman et al. |
| 4,239,826 A | 12/1980 | Knott, II et al. |
| 4,391,637 A | 7/1983 | Mardis et al. |
| 4,393,007 A | 7/1983 | Priester et al. |
| 4,398,642 A | 8/1983 | Okudaria et al. |
| 4,410,364 A | 10/1983 | Finlayson et al. |
| 4,412,018 A | 10/1983 | Finlayson et al. |
| 4,429,079 A | 1/1984 | Shibata et al. |
| 4,434,075 A | 2/1984 | Mardis et al. |
| 4,434,076 A | 2/1984 | Mardis et al. |
| 4,442,163 A | 4/1984 | Kühner et al. |
| 4,450,095 A | 5/1984 | Finlayson |
| 4,472,538 A | 9/1984 | Kamigaito et al. |
| 4,482,695 A | 11/1984 | Barbee et al. |
| 4,517,112 A | 5/1985 | Mardis et al. |
| 4,536,425 A | 8/1985 | Hekal |
| 4,546,126 A | 10/1985 | Breitenfellner et al. |
| 4,595,715 A | 6/1986 | Kuze et al. |
| 4,600,409 A | 7/1986 | Campbell |
| 4,646,925 A | 3/1987 | Nohara |
| 4,676,929 A | 6/1987 | Rittler |
| 4,677,158 A | 6/1987 | Tso et al. |
| 4,680,208 A | 7/1987 | Aoki et al. |
| 4,720,420 A | 1/1988 | Crass et al. |
| 4,725,466 A | 2/1988 | Crass et al. |
| 4,739,007 A | 4/1988 | Okada et al. |
| 4,742,098 A | 5/1988 | Finlayson et al. |
| 4,769,078 A | 9/1988 | Tso |
| 4,777,206 A | 10/1988 | Rittler |
| 4,810,734 A | 3/1989 | Kawasumi et al. |
| 4,889,885 A | 12/1989 | Usuki et al. |
| 4,894,411 A | 1/1990 | Okada et al. |
| 4,946,365 A | 8/1990 | Kudert et al. |
| 4,957,980 A | 9/1990 | Kobayashi et al. |
| 4,983,432 A | 1/1991 | Bissot |
| 4,983,719 A | 1/1991 | Fox et al. |
| 4,994,313 A | 2/1991 | Shimizu et al. |
| 5,028,462 A | 7/1991 | Matlack et al. |
| 5,034,252 A | 7/1991 | Nilsson et al. |
| 5,037,285 A | 8/1991 | Kudert et al. |
| 5,091,462 A | 2/1992 | Fukui et al. |
| 5,102,948 A | 4/1992 | Deguchi et al. |
| 5,110,501 A | 5/1992 | Knudson, Jr. et al. |
| 5,149,485 A | 9/1992 | Belcher |
| 5,153,061 A | 10/1992 | Cavagne et al. |
| 5,153,062 A | 10/1992 | Grolig et al. |
| 5,104,440 A | 11/1992 | Deguchi et al. |
| 5,164,460 A | 11/1992 | Yano et al. |
| 5,206,284 A | 4/1993 | Fukui et al. |
| 5,221,507 A | 6/1993 | Beck et al. |
| 5,248,720 A | 9/1993 | Deguchi et al. |
| 5,273,706 A | 12/1993 | Laughner |
| 5,314,987 A | 5/1994 | Kim et al. |
| 5,334,241 A | 8/1994 | Jordan |
| 5,336,647 A | 8/1994 | Naé et al. |
| 5,340,884 A | 8/1994 | Mills et al. |
| 5,374,306 A | 12/1994 | Schlegel et al. |
| 5,382,650 A | 1/1995 | Kasowski et al. |
| 5,385,776 A | 1/1995 | Maxfield et al. |
| 5,414,042 A | 5/1995 | Yasue et al. |
| 5,429,999 A | 7/1995 | Naé et al. |
| 5,434,000 A | 7/1995 | Konagaya et al. |
| 5,514,734 A | 5/1996 | Maxfield et al. |
| 5,523,045 A | 6/1996 | Kudert et al. |
| 5,530,052 A | 6/1996 | Takekoshi et al. |
| 5,552,469 A | 9/1996 | Beall et al. |
| 5,578,672 A | 11/1996 | Beall et al. |
| 5,612,138 A | 3/1997 | Kurz et al. |
| 5,620,774 A | 4/1997 | Etchu et al. |
| 5,648,159 A | 7/1997 | Sato |
| 5,660,761 A | 8/1997 | Katsumoto et al. |
| 5,665,454 A | 9/1997 | Hosoi et al. |
| 5,728,764 A | 3/1998 | Bauer et al. |
| 5,747,560 A | 5/1998 | Christiani et al. |
| 5,780,376 A | 7/1998 | Gonzales et al. |
| 5,807,630 A | 9/1998 | Christie et al. |
| 5,830,544 A | 11/1998 | Kerscher et al. |
| 5,849,830 A | 12/1998 | Tipursky et al. |
| 5,876,812 A | 3/1999 | Frisk et al. |
| 5,882,751 A | 3/1999 | Occhiello et al. |
| 5,916,685 A | 6/1999 | Frisk |
| 5,942,320 A | 8/1999 | Miyake et al. |
| 5,952,093 A | 9/1999 | Nichols et al. |
| 5,972,448 A | 10/1999 | Frisk et al. |
| 5,993,769 A | 11/1999 | Pinnavaia et al. |
| 6,017,632 A | 1/2000 | Pinnavaia et al. |
| 6,034,163 A | 3/2000 | Barbee et al. |
| 6,036,765 A | 3/2000 | Farrow et al. |
| 6,050,509 A | 4/2000 | Clarey et al. |
| 6,057,396 A | 5/2000 | Lan et al. |
| 6,060,549 A | 5/2000 | Li et al. |
| 6,071,988 A | 6/2000 | Barbee et al. |
| 6,084,019 A | 7/2000 | Matayabas, Jr. et al. |
| 6,117,541 A | 9/2000 | Frisk |
| 6,120,860 A | 9/2000 | Bowen et al. |
| 6,156,835 A | 12/2000 | Anderson et al. |
| 6,162,857 A | 12/2000 | Trexler et al. |
| 6,232,388 B1 | 5/2001 | Lan et al. |
| 6,254,803 B1 | 7/2001 | Matthews et al. |

FOREIGN PATENT DOCUMENTS

| | | |
|---|---|---|
| EP | 940430 | 9/1999 |
| GB | 1090036 | 11/1967 |
| GB | 2123014 | 1/1984 |
| JP | 75001156 | 1/1975 |
| JP | 75005735 | 3/1975 |
| JP | 75005751 | 3/1975 |
| JP | 75010196 | 4/1975 |
| JP | 76029697 | 3/1976 |
| JP | 62073943 | 4/1987 |
| JP | 7026123 | 1/1995 |
| JP | 09048908 | 2/1997 |
| JP | 9176461 | 7/1997 |
| JP | 9217012 | 8/1997 |
| JP | 10077427 | 3/1998 |
| JP | 10133013 | 5/1998 |
| JP | 10168305 | 6/1998 |
| WO | WO 84/03096 | 8/1984 |
| WO | WO 93/04117 | 3/1993 |
| WO | WO 93/04118 | 3/1993 |
| WO | WO 93/04125 | 3/1993 |
| WO | WO 93/11190 | 6/1993 |
| WO | WO 93/14922 | 8/1993 |
| WO | WO 94/11430 | 5/1994 |
| WO | WO 94/29378 | 12/1994 |
| WO | WO 95/06090 | 3/1995 |
| WO | WO 95/14733 | 6/1995 |
| WO | WO 96/08526 | 3/1996 |
| WO | WO 96/25458 | 8/1996 |
| WO | WO 97/02323 | 1/1997 |
| WO | WO 97/17398 | 5/1997 |
| WO | WO 97/30950 | 8/1997 |
| WO | WO 97/31057 | 8/1997 |
| WO | WO 97/31973 | 9/1997 |
| WO | WO 97/44384 | 11/1997 |
| WO | WO 98/01346 | 1/1998 |
| WO | WO 98/29499 | 7/1998 |
| WO | WO 98/53000 | 11/1998 |

| WO | WO 99/02593 | 1/1999 |
| WO | WO 99/38914 | 8/1999 |
| WO | WO 99/41299 | 8/1999 |

OTHER PUBLICATIONS

Pinnavaia et al., "Clay–Reinforced Epoxy Nanocomposites," *Chem. Mater.*, *6*, 2216–2219 (1994).

Sugahara et al., "Clay–Organic Nano–Composite; Preparation of a Kaolinite—Poly(vinylpyrrolidone) intercalation Compoun," *J. Ceramic Society of Japan*, *100*, 413–416 (1992).

Yano et al., "Synthesis and properties of polyimide–clay hybrid," *ACS, Polymer Preprints*, *32*, 65–66, (1991).

Fukushima et al., "Swelling Behavior of Montmorillonite by Poly–6–Amide," *Clay Minerals*, *23*, 27–34 (1988).

Fukushima et al., "Synthesis of an Intercalated Compound of Montmorillonite and 6–Polyamide," *J. Inclusion Phenomena*, *5*, 473–482 (1987).

Okada et al., "Synthesis and Characterization of a Nylon 6–Clay Hybrid," *ACS, Polymer Preprints*, *28*, 447–448, (1987).

Fahn et al., "Reaction Products of Organic Dye Molecules with Acid–Treated Montmorillonite," *Clay Minerals*, *18*, 447–458 (1983).

Greenland, "Adsorption of Polyvinyl Alcohols by Montmorillonite," *J. Colloid Sci.*, *18*, 647–664 (1963).

MSDS—Polyvinyl Alcohol.

MSDS—Clay (Montmorillonite).

*Encyclopedia of Polymer Science and Engineering*, 2nd Edition, 12, 364–383 (1988).

* cited by examiner

COLORANT COMPOSITION, A POLYMER NANOCOMPOSITE COMPRISING THE COLORANT COMPOSITION AND ARTICLES PRODUCED THEREFROM

RELATED APPLICATION

This application claims priority to U.S. provisional patent application Serial No. 60/111,321, filed Dec. 7, 1998, which is incorporated herein by this reference in its entirety.

FIELD OF THE INVENTION

This invention relates generally to a colorant composition and a polymer-clay nanocomposite having improved color and appearance comprising a colorant composition. This invention further relates to articles produced from the polymer-clay nanocomposite.

BACKGROUND OF THE INVENTION

There is much interest in polymer/clay nanocomposites because of the improved properties exhibited by the nanocomposites. For example, U.S. Pat. No. 4,739,007 discloses polyamide/clay nanocomposite materials containing clays intercalated with alkylammonium salts. Polymer/clay nanocomposites typically suffer from poor color and appearance due to the presence of the clay.

One objective of this invention is to provide clays intercalated with colorants and/or optical brighteners that mask the color of the clay and provide polymer/clay nanocomposites that are colorless, white, or slightly colored. It is also an object of this invention to provide clays intercalated with colorants that provide colored polymer/clay nanocomposites.

Colorants or pigments derived from the reaction of a cationic dye and a clay are known. For example, R. Fahn and K. Fenderl, *Clay Minerals*, 18, 447–458 (1987) disclose pigments derived from montmorillonite clay intercalated with certain cationic dyes. However, incorporation of the pigments into thermoplastic polymer/clay nanocomposites, especially those with processing temperatures well above 200° C., is neither contemplated nor disclosed.

Therefore, a need still exists for a colorant composition, a polymer-clay nanocomposite comprising the colorant composition and articles produced from the polymer-clay nanocomposite that have improved color and/or appearance.

SUMMARY OF THE INVENTION

In accordance with the purpose(s) of this invention, as embodied and broadly described herein, this invention, in one embodiment, relates to a polymer-clay nanocomposite comprising (i) a melt-processible matrix polymer, and incorporated therein (ii) a colorant composition comprising a clay material intercalated with at least one cationic colorant having a cation group and a chromophore group.

In another embodiment, this invention relates to a polymer-clay nanocomposite comprising (i) a melt-processible matrix polymer, and incorporated therein (ii) an optical brightener composition comprising a clay material intercalated with at least one optical brightener having a cation group and a chromophore group.

In another embodiment, this invention relates to a colorant composition comprising (i) at least one cationic colorant having a cation group and a chromophore group, wherein the cation group is separated from the chromophore group by at least two carbons, and (ii) a clay material intercalated with the cationic colorant.

In yet another embodiment, this invention relates to a composition comprising (i) at least one optical brightener having a cation group and a chromophore group, wherein the cation group is separated from the chromophore group by at least two carbons, and (ii) a clay material intercalated with the optical brightener.

In yet another embodiment, the present invention relates to a process for preparing a polymer-clay nanocomposite comprising (i) preparing an intercalated layered clay material by reacting a swellable layered clay material with a cationic colorant, optical brightener, or a mixture thereof, and (ii) incorporating the intercalated clay material in a matrix polymer by melt processing the matrix polymer with the intercalated clay.

Additional advantages of the invention will be set forth in part in the detailed description, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

The present invention may be understood more readily by reference to the following detailed description of the invention and the examples provided therein. It is to be understood that this invention is not limited to the specific processes and conditions described, as specific processes and/or process conditions for processing polymers as such may, of course, vary. It is also understood that the terminology used herein is for the purpose of describing particular embodiments only and is not intended to be limiting.

It must also be noted that, as used in the specification and the appended claims, the singular forms "a," "an" and "the" included plural references unless the context clearly dictates otherwise.

Ranges may be expressed herein as from "about" or "approximately" one particular value and/or to "about" or "approximately" another particular value. When such a range is expressed, another embodiment includes from the one particular and/or to the other particular value. Similarly, when values are expressed as approximations, by use of the antecedent "about," it will be understood that the particular value forms another embodiment.

DEFINITIONS

Whenever used in this specification or the claims, the terms set forth shall have the following meanings:

"Colorant(s)" or "colorant composition(s)" shall mean any substance that imparts color to another material or mixture. Colorants are either dyes or pigments and may be naturally present in a material, admixed with a material or applied to it in solution. "Optical brightener(s)" or "fluorescent brightener(s)" shall mean any fluorescent organic compound that absorbs mainly UV light and emits it as visible light.

"Pigment(s)" shall mean any substance that imparts color to another material or mixture and is sometimes used synonymously with "colorant" or "dye." Pigments are usually dry powders and may be organic or inorganic.

"Dye(s)" shall mean any natural or synthetic organic colorant, which may be either acidic or basic. The distinction between natural dyes and pigments is often arbitrary.

"Chromophore(s)" shall mean a chemical grouping that when present in an aromatic compound (the chromogen), gives color to the compound by causing a displacement of, or appearance of, absorbent bands in the visible spectrum.

"Clay(s)," "clay material(s)," "Layered clay(s)" or "layered clay material(s)" shall mean any organic or inorganic material or mixtures thereof, such as a smectite clay mineral, which is in the form of a plurality of adjacent, bound layers. The layered clay comprises platelet particles and is typically swellable.

"Platelet particles," "platelets" or "particles" shall mean individual or aggregate unbound layers of the layered clay material. These layers may be in the form of individual platelet particles, ordered or disordered small aggregates of platelet particles (tactoids), and small aggregates of tactoids.

"Dispersion" or "dispersed" is a general term that refers to a variety of levels or degrees of separation of the platelet particles. The higher levels of dispersion include, but are not limited to, "intercalated" and "exfoliated."

"Intercalated" or "intercalate(s)" shall mean a layered clay material that includes an intercalant, e.g. cationic colorant, disposed between adjacent platelet particles or tactoids of the layered material.

"Exfoliate" or "exfoliated" shall mean platelets dispersed predominantly in an individual state throughout a carrier material, such as a matrix polymer. Typically, "exfoliated" is used to denote the highest degree of separation of platelet particles.

"Exfoliation" shall mean a process for forming an exfoliate from an intercalated or otherwise less dispersed state of separation.

"Nanocomposite(s)" or "nanocomposite composition(s)" shall mean a polymer or copolymer having dispersed therein a plurality of individual platelets obtained from an exfoliated, layered and intercalated clay material.

"Matrix polymer" shall mean a thermoplastic or melt-processible polymer in which the clay intercalate is dispersed to form a nanocomposite. In this invention, however, the platelet particles are predominantly exfoliated in the polymer to form a nanocomposite.

DESCRIPTION OF THE EMBODIMENTS

The present invention relates generally to a colorant or optical brightener composition comprising a layered clay material that is intercalated with at least one cationic colorant, optical brightener and/or a mixture thereof. This invention also relates generally to a polymer nanocomposite comprising a melt-processible matrix polymer and the composition, and to molded articles, film or fiber produced from the polymer nanocomposite.

One embodiment of this invention relates to colorant compositions comprising a clay material that is intercalated with one or more cationic dyes and/or optical brighteners having a cation group and a chromophore group, wherein the cation group is separated from the chromophore group by at least two carbon atoms. These colorant compositions have exceptional thermal stability and are, therefore, more useful for incorporation into thermoplastic polymers by a wider variety of methods, e.g., the compositions could withstand polymerization conditions. Other structures may also have sufficient thermal stability under processing, e.g., compounding conditions.

In another embodiment, this invention relates to a polymer nanocomposite, preferably a polyester nanocomposite. The desired colorant composition and any additional clay material desired are added to monomers or oligomers, and polymerization processes known in the art prepare the polymer nanocomposite. In yet another embodiment of this invention, the desired colorant compositions and any additional clay material desired are melt-compounded with a melt-processable matrix polymer to form the nanocomposite of this invention.

Many of the suitable clay materials, especially the natural clays, are colored. In an embodiment of this invention, the clay material is intercalated with a sufficient amount of the appropriate one or more cationic dyes to cover the color of the clay in the nanocomposite to produce a colorless or slightly colored nanocomposite. In another embodiment of this invention, the clay material is intercalated with sufficient amount of the appropriate one or more cationic dyes required to impart a desired color to the nanocomposite. In yet another embodiment of this invention, one or more pigments are used in combination to attain the nanocomposite with the desired color. In still another embodiment of this invention, one or more pigments are used in combination with a dye-free clay, which is typically intercalated or treated, to achieve the desired color and nanocomposite properties.

Frequently, achieving the desired appearance requires the use of more than one dye or the combination of dyes and an optical brightener. The dyes and optical brighteners may be co-intercalated into the same clay, optionally with other intercalants, or may be used individually to intercalate clays, optionally with other intercalants, and then combined into the composite, optionally with additional dye-free clay which is typically modified, in the appropriate amounts to achieve the desired appearance. Thus, the range of color and amount of color may vary substantially depending on many factors including choice and concentration of cationic colorants and/or optical brighteners, choice and concentration of clays, choice and concentration of dye-free clay, and choice and concentration of other additives.

The colorant compositions or pigments of this invention may be prepared by intercalating a cationic colorant and/or an optical brightener into the gallery of the layered clay material. Many processes to intercalate materials, especially organic cation salts, into clays are known, and may be used in the process of this invention. Illustrative of these processes is the modification of a layered clay with one or more cationic colorants by the process of dispersing a layered clay into hot water, most preferably from 50 to 80° C., adding the desired cationic colorant salts separately or adding a mixture of the cationic colorant salts (neat or dissolved in water or alcohol) with agitation, then blending for a period of time sufficient for the organic cations to exchange most of the metal cations present in the galleries between the layers of the clay material. Then, the pigment is isolated by methods known in the art including, but not limited to, filtration, centrifugation, spray drying, and their combinations.

It is desirable to use a sufficient amount of the organic cation colorant salts to permit exchange of the metal cations in the galleries of the layered particle for organic cations; therefore, at least about 0.5 equivalent of total organic cation salts is used and up to about 3 equivalents of organic cation salts can be used. It is preferred that about 0.5 to 2 equivalents of organic cation colorant salts be used, more preferable about 1.0 to 1.5 equivalents. It is desirable, but not required, to remove most of the metal cation salts and most of the excess organic cation colorant salts by washing and other techniques known in the art.

The particle size of the resulting colorant or pigment is reduced in size by methods known in the art, including, but not limited to, grinding, pulverizing, hammer milling, jet milling, and their combinations. It is preferred that the average particle size be reduced to less than 100 micron in diameter, more preferably less than 50 micron in diameter, and most preferably less than 20 micron in diameter. The process to prepare the colorant composition or pigment may be conducted in a batch, semi-batch, or continuous manner.

Any cationic (basic) colorant may be used in the polymer nanocomposite or in the practice of this invention, and many cationic colorants are known (see for example Colour Index, $3_{rd}$ Ed., Vol. 1, pp. 1611–1688, The Soc. of Dyers & Colourists, 1997). It has been unexpectedly found that some colorants or pigments have excellent thermal stability and are therefore more generally useful and more generally preferred for the formation of polymer nanocomposites.

More particularly, it has been discovered that colorant or pigment compositions comprising a clay material that is intercalated with a cation (basic) dye in which the cation group or groups are separated from the chromophore group by at least two carbon atoms have unexpectedly good thermal stability and are sufficiently thermally stable to permit the preparation of polymer nanocomposites by in-situ polymerization processes, for example, which typically require prolonged heating at temperature above the melting point of the polymer.

The preferred colorants useful in the practice of this invention correspond to the general formula (I):

wherein

A is a mono-, di-, tri-, or tetra-valent colorant moiety comprising the chromophoric classes of anthraquinones, methines, anthrapyridones, triphenodioxazines, fluorindines, phthaloylpyrrocolines, coumarins, phthaloylacridones, 4-amino-1,8-naphthalimidies, thioxanthrones, 2,5-arylaminoterephthalic acids or esters, benzanthrones, 3,6-diaminopyromellitic acid diimides, quinophthalones, naphthalene 1:4:5:8-tetra carboxylic bis-imides; isothiazoloanthrones, anthrapyrimidines, anthrapyrimidones, indanthrones, phthalocyanines, naphthalocyanines, perinones, 3-aryl-2,5-dioxypyrrolines, 3,4,9,10-perylenetetracarboxylic acid diimides, or 5-arylidene-2-(5H)furanones;

X is a linking group comprising —O—, —S—, —SO$_2$—, —CO$_2$—, —CON(R$_1$)—, —SO$_2$N(R$_1$)—, or a covalent bond, wherein R$_1$ is hydrogen, C$_1$–C$_8$ alkyl, aryl, or C$_5$–C$_7$ cycloalkyl;

R is C$_2$–C$_8$ alkylene or —(C$_2$–C$_8$ alkylene)-[(X-(C$_2$–C$_8$ alkylene)]$_{1-3}$—;

Y is a moiety having the general formula (II):

wherein Z$^-$ is a halogen ion; R$_2$ is C$_1$–C$_8$ alkyl or C$_2$–C$_8$ alkenyl; R$_3$ and R$_4$ are independently C$_1$–C$_8$ alkyl, C$_3$–C$_8$ alkenyl, C$_5$–C$_7$ cycloalkyl, or may be combined to produce a moiety having the general formula (III):

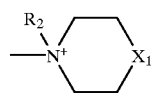

wherein

X$_1$ is a covalent bond, —CH$_2$—, —O—, —S—, —SO$_2$—, or —N(R$_5$)—, wherein R$_5$ is an acyl radical; and n is 1–4.

In the above definitions, the term C$_1$–C$_8$ alkyl is used to denote a straight or branched chain saturated hydrocarbon radical containing one to eight carbon and this radical substituted with C$_1$–C$_8$ alkoxy, aryl or C$_3$–C$_7$ cycloalkyl. The term C$_3$–C$_8$ alkenyl is used to describe a straight or branched chain monovalent hydrocarbon radical having three to eight carbons and containing at least one carbon to carbon double bond. The term C$_5$–C$_7$ cycloalkyl is used to describe a saturated cyclic hydrocarbon monovalent radical containing five to seven carbons and which may be substituted with at least one C$_1$–C$_8$ alkyl group. The term aryl is used to describe a phenyl radical and phenyl substituted with one or more groups selected from C$_1$–C$_8$ alkyl, C$_1$–C$_8$ alkoxy, or halogen. The term C$_2$–C$_8$ alkylene is used to describe a straight or branched chain divalent hydrocarbon radical containing two to eight carbon atoms. The term acyl is used to describe the following structures: —CO—(C$_1$–C$_8$ alkyl), —CO-(aryl), —CO$_2$—(C$_1$–C$_8$ alkyl), —SO$_2$—(C$_1$–C$_8$ alkyl), —SO$_2$-aryl, and —SO$_2$—(C$_5$–C$_7$ cycloalkyl). The term halogen is used to denote fluorine, chlorine, bromine, and iodine.

Suitable optical brighteners are selected from the classes of stilbenes, styrylbenoxazoles, coumarins, benzocoumarins, 1,4-bis(benzoxazolyl-2'-yl)-naphthalones, naphthalimides, thiophene oxazoics, pyrazolines, xanthenes, and the like, and have cationic (basic) sites rendering them suitable for dyeing acrylic fibers, for example (see Colour Index, $3_{rd}$ Ed., Vol. 2, pp. 2745–2771, The Soc. of Dyers & Colourists, 1971).

The colorant composition and polymer-clay nanocomposite of the present invention comprise less than about 25 weight percent, preferably from about 0.5 to about 20 weight percent, more preferably from about 0.5 to about 15 weight percent, and most preferably from about 0.5 to about 10 weight percent of a swellable layered clay material that is intercalated with a cationic colorant.

The intercalated clay material of the colorant composition has platelet particles, which are dispersed in the polymer to form the polymer-clay nanocomposite. The polymer nanocomposite is preferably a polyester polymer or copolymer nanocomposite having an I.V. of at least 0.7 dL/g as measured in phenol/tetrachloroethane (60 wt. %/40 wt. %) at 25° C. The amount of platelet particles is determined by measuring the amount of silicate residue in the ash of the polymer/platelet composition when treated in accordance with ASTM D5630-94.

Useful clay materials include natural, synthetic, and modified phyllosilicates. Illustrative of such natural clays is smectite clays, such as montmorillonite, saponite, hectorite, mica, vermiculite, bentonite, nontronite, beidellite, volkonskoite, saponite, magadite, kenyaite, and the like. Illustrative of such synthetic clays is synthetic mica, synthetic saponite, synthetic hectorite, and the like. Illustrative of such modified clays are fluoronated montmorillonite, fluoronated mica, and the like. Suitable clays are available from various companies including Nanocor, Inc., Southern Clay Products, Kunimine Industries, Ltd., and Rheox.

Preferred clay materials are phyllosilicates of the 2:1 type having a cation exchange capacity of 0.3 to 2.0 milliequivalents per gram of mineral (meq/g). The most preferred clay materials are smectite clay minerals, particularly bentonite or montmorillonite, more particularly Wyoming-type sodium montmorillonite or Wyoming-type sodium bentonite.

Generally, the layered clay materials useful in this invention are an agglomeration of individual platelet particles that are closely stacked together like cards, in domains called tactoids. The individual platelet particles of the clays preferably have thickness of less than about 2 nm and diameter in the range of about 10 to about 3000 nm. Preferably, the clays are dispersed in the polymer so that most of the clay material exists as individual platelet particles, small tactoids, and small aggregates of tactoids. Preferably, a majority of the tactoids and aggregates in the polymer/clay nanocomposites of the present invention will have thickness in its smallest dimension of less than about 20 nm. Polymer/clay nanocomposite compositions with the higher concentration of individual platelet particles and fewer tactoids or aggregates are preferred.

Moreover, the layered clay materials are typically swellable free flowing powders having a cation exchange capacity from about 0.3 to about 3.0 meg/q, more preferably from 0.9 to about 1.5 meq/g and most preferably from 0.95 to about 1.25 meq/g. The clay may have a wide variety of exchangeable cations present in the galleries between the layers of the clay, including, but not limited to, cations comprising the alkaline metals (group IA), the alkaline earth metals (group IIA), and their mixtures. The most preferred cation is sodium; however, any cation or combination of cations may be used provided that most of the cations are exchanged for organic colorant cations during the process of this invention.

Other non-clay materials having the above-described ion-exchange capacity and size, such as chalcogens, may also be used as the source of platelet particles under the present invention. Chalcogens are salts of a heavy metal and group VIA (O, S, Se, and Te). These materials are known in the art and do not need to be described in detail here.

If desired, the clay material may be treated for the purposes of aiding dispersion or exfoliation in a polymer and/or improving the strength of the polymer/clay interface, and any treatment that achieves the above goals may be used before, during, or after intercalation of the clay with one or more colorants, optical brighteners, and/or their mixtures.

Examples of useful treatments include intercalation of the clay with water soluble or water insoluble polymers, oligomers, monomers, or organic compounds, silane compounds, metals, organometallics, other organic cations, and/or their combinations, dispersion of the clay into a solvent or dispersing aid, compounding into oligomeric materials, adding or mixing dispersing aids, and the like.

Treatment of the clay can be accomplished prior to the addition of a water-dispersible polymer to the clay material, during the dispersion of the clay with a water-soluble polymer or during a subsequent melt blending or melt fabrication step.

Examples of useful pretreatment with polymers and oligomers include those disclosed in U.S. Pat. Nos. 5,552,469 and 5,578,672, incorporated herein by reference. Examples of useful polymers for treating the intercalated clays include polyvinyl pyrrolidone, polyvinyl alcohol, polyethylene glycol, polytetrahydrofuran, polystyrene, polycaprolactone, certain water-dispersible polyesters, Nylon-6, poly(m-xylylene adipamide) and the like.

Examples of useful pretreatment with organic reagents and monomers include those disclosed in EP 780,340 A1, incorporated herein by reference. Examples of useful organic reagents and monomers for intercalating the swellable layered clay include dodecylpyrrolidone, caprolactone, caprolactam, ethylene carbonate, ethylene glycol, bishydroxyethyl terephthalate, dimethyl terephthalate, adipic acid, m-xylylenediamine and the like or mixtures thereof.

Examples of useful pretreatment with silane compounds include those treatments disclosed in WO 93/11190, incorporated herein by reference. Examples of useful silane compounds includes (3-glycidoxypropyl)trimethoxysilane, 2-methoxy(polyethyleneoxy)propyl heptamethyl trisiloxane, octadecyl dimethyl (3-trimethoxysilylpropyl) ammonium chloride and the like.

Organic cations that can be used to intercalate the clay material of the colorant composition and/or nanocomposite of this invention are derived from organic cation salts, preferably onium salt compounds. Organic cation salts useful for the colorant composition and nanocomposite of this invention may generally be represented as follows:

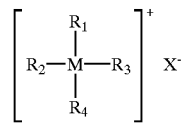

wherein

M is either nitrogen or phosphorous; $X^-$ is a halide, hydroxide, or acetate anion, preferably chloride and bromide; and $R_1$, $R_2$, $R_3$, and $R_4$ are independently organic and oligomeric ligands or may be hydrogen.

Examples of useful organic ligands include, but are not limited to, linear or branched alkyl groups having 1 to 22 carbon atoms, more preferably 1 to 12 carbon atoms, aralkyl groups which are benzyl and substituted benzyl moieties including fused-ring moieties having linear chains or branches of 1 to 100 carbon atoms, more preferably 1 to 12 carbon atoms, in the alkyl portion of the structure, aryl groups such as phenyl and substituted phenyl including fused-ring aromatic substituents, beta, gamma unsaturated groups having six or less carbon atoms, and alkyleneoxide groups having 2 to 6 carbon atoms, more preferably 3 to 5 carbon atoms. Examples of useful oligomeric ligands include, but are not limited to, poly(alkylene oxide), polystyrene, polyacrylate, polycaprolactone, and the like.

Useful organic cations for this invention also include, but are not limited to, alkyl ammonium ions, such as dodecyl ammonium, octadecyl ammonium, bis(2-hydroxyethyl) octadecyl methyl ammonium, octadecyl benzyl dimethyl ammonium, tetramethyl ammonium, and the like, and alkyl phosphonium ions such as tetrabutyl phosphonium, trioctyl octadecyl phosphonium, tetraoctyl phosphonium, octadecyl triphenyl phosphonium, and the like.

Illustrative examples of suitable polyalkoxylated ammonium compounds include the hydrochloride salts of polyalkoxylated amines such as JEFFAMINE (of Huntsman Chemical), namely, JEFFAMINE-506, which was analyzed to be an oligooxyethlene amine with number average molecular weight of about 1100 g/mol, and JEFFAMINE 505 which was analyzed to be an oligooxypropylene amine with number average molecular weight of about 640 g/mol. Other hydrochloride salts of polyalkoxylated amines include the hydrochloride salt of ETHOMEEN 18/25 (of Akzo Chemie America), which is octadecyl bis(polyoxyethylene

[15])amine, wherein the numbers in brackets refer to the total number of ethylene oxide units. ETHOQUAD (of Akzo Chemie America), or, namely, ETHOQUAD 18/25, which is octadecyl methyl bis(polyoxyethylene[15]) ammonium chloride is an example of a salt of a polyalkoxylated amine. Preferred polyalkoxylated organic cations for use in polyesters, such as poly(ethylene terephthalate), are polyalkoxylated ammonium compounds.

Numerous methods to modify layered clays with organic cations are known, and any of these may be used in the process of this invention.

If desired, a dispersing aid may be present during or prior to the formation of the composite by melt mixing for the purposes of aiding exfoliation of the treated or untreated swellable layered particles into the polymer. Many such dispersing aids are known, covering a wide range of materials including water, alcohols, ketones, aldehydes, chlorinated solvents, hydrocarbon solvents, aromatic solvents, and the like or combinations thereof.

It should be appreciated that on a total composition basis, dispersing aids and/or pretreatment compounds may account for significant amount of the total composition, in some cases up to about 30 weight percent. While it is preferred to use as little dispersing aid/pretreatment compounds as possible, the amounts of dispersing aids and/or pretreatment compounds may be as much as about 8 times the amount of the platelet particles.

This invention also relates to polymer nanocomposites comprising the colorant compositions of this invention. The polymer nanocomposite compositions of this invention may comprise a wide range of materials depending on the pigment and polymer selected. Any melt processable polymer may be used in this invention. Illustrative of meltprocessible polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrenes, polyethylene-covinyl alcohols (EVOH), and the like or their combinations and blends. Although the preferred polymers are linear or nearly linear, polymers with other architectures, including branched, star, cross-linked and dendritic structures may be used, if desired.

The preferred polymers include those materials that are suitable for use in the formation of multilayer structures with polyesters, and include polyesters, polyamides, polyethylene-co-vinyl alcohols (such as EVOH) and similar or related polymers and/or copolymers. The preferred polyester is poly(ethylene terephthalate) (PET) or a copolymer thereof. The preferred polyamide is poly(m-xylylene adipamide or a copolymer thereof.

Suitable polyesters include at least one dibasic acid and at least one glycol. The primary dibasic acids are terephthalic, isophthalic, naphthalenedicarboxylic, 1,4-cyclohexanedicarboxylic acid and the like. The various isomers of naphthalenedicarboxylic acid or mixtures of isomers may be used, but the 1,4-, 1,5, 2,6-, and 2,7-isomers are preferred. The 1,4-cyclohexanedicarboxylic acid may be in the form of cis, trans, or cis/trans mixtures. In addition to the acid forms, the lower alkyl esters or acid chlorides may be also be used.

The polyester may be prepared from one or more of the following dicarboxylic acids or glycols.

The dicarboxylic acid component of the polyester may optionally be modified with up to about 50 mole percent of one or more different dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of suitable dicarboxylic acids include phthalic acid, terephthalic acid, isophthalic acid, naphthalene-2,6-dicarboxylic acid, cyclohexanedicarboxylic acid, cyclohexanediacetic acid, diphenyl-4,4'-dicarboxylic acid, phenylene (oxyacetic acid) succinic acid, glutaric acid, adipic acid, azelaic acid, sebacic acid, and the like. Polyesters may also be prepared from two or more of the above dicarboxylic acids.

Typical glycols used in the polyester include those containing from two to about ten carbon atoms. Preferred glycols include ethylene glycol, propanediol, 1,4-butanediol, 1,6-hexanediol, 1,4-cyclohexanedimethanol, diethylene glycol, neopentyl glycol, and the like. The glycol component may optionally be modified with up to about 50 mole percent, preferably up to about 25 mole percent, and more preferably up to about 15 mole percent of one or more different diols. Such additional diols include cycloaliphatic diols preferably having 6 to 20 carbon atoms or aliphatic diols preferably having 3 to 20 carbon atoms. Examples of such diols include: diethylene glycol, neopentyl glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(2-hydroxyethoxy)-benzene, 2,2b-is-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like. Polyesters may also be prepared from two or more of the above diols.

Small amounts of multifunctional polyols such as trimethylolpropane, pentaerythritol, glycerol and the like may be used, if desired. When using 1,4-cyclohexanedimethanol, it may be the cis, trans or cis/trans mixtures. When using phenylenedi(oxyacetic acid), it may be used as 1,2; 1,3; 1,4 isomers, or mixtures thereof.

The polymer may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, trimellitic acid, pyromellitic acid and other polyester forming polyacids or polyols generally known in the art.

Suitable polyamides include partially aromatic polyamides, aliphatic polyamides, wholly aromatic polyamides and/or mixtures thereof. By "partially aromatic polyamide," it is meant that the amide linkage of the partially aromatic polyamide contains at least one aromatic ring and a nonaromatic species. Suitable polyamides have an article forming molecular weight and preferably an I.V. of greater than 0.4.

Preferred wholly aromatic polyamides comprise in the molecule chain at least 70 mole % of structural units derived from m-xylylene diamine or a xylylene diamine mixture comprising m-xylylene diamine and up to 30% of p-xylylene diamine and an aliphatic dicarboxylic acid having 6 to 10 carbon atoms, which are further described in Japanese Patent Publications No. 1156/75, No. 5751/75, No. 5735/75 and No. 10196/75 and Japanese Patent Application Laid-Open Specification No. 29697/75.

Polyamides formed from isophthalic acid, terephthalic acid, cyclohexanedicarboxylic acid, meta- or para-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred partially aromatic polyamides include, but are not limited to poly(m-xylylene adipamide), poly(m-xylylene adipamide-co-isophthalamide), poly(hexamethylene isophthalamide), poly(hexamethylene isophthalamide-co-terephthalamide), poly(hexamethylene adipamide-co-isophthalamide), poly(hexamethylene adipamide-co-terephthalamide), poly(hexamethylene isophthalamide-co-terephthalamide) and the like or mixtures thereof. More preferred partially aromatic polyamides include, but are not limited to poly(m-xylylene adipamide), poly(hexamethylene isophthalamide-co-terephthalamide), poly(m-xylylene adipamide-co-isophthalamide), and/or mixtures thereof. The most preferred partially aromatic polyamide is poly(m-xylylene adipamide).

Preferred aliphatic polyamides include, but are not limited to poly(hexamethylene adipamide) and poly(caprolactam). The most preferred aliphatic polyamide is poly (hexamethylene adipamide). Partially aromatic polyamides are preferred over the aliphatic polyamides where good thermal properties are crucial.

Preferred aliphatic polyamides include, but are not limited to polycapramide (nylon 6), poly-aminoheptanoic acid (nylon 7), poly-aminonanoic acid (nylon 9), polyundecaneamide (nylon 11), polyaurylactam (nylon 12), poly (ethylene-adipamide) (nylon 2,6), poly(tetramethylene-adipamide) (nylon 4,6), poly(hexamethylene-adipamide) (nylon 6,6), poly(hexamethylene-sebacamide) (nylon 6,10), poly(hexamethylene-dodecamide) (nylon 6,12), poly (octamethylene-adipamide) (nylon 8,6), poly (decamethylene-adipamide) (nylon 10,6), poly (dodecamethylene-adipamide) (nylon 12,6) and poly (dodecamethylene-sebacamide) (nylon 12,8).

The most preferred polyamides include poly(m-xylylene adipamide), polycapramide (nylon 6) and poly (hexamethylene-adipamide) (nylon 6,6). Poly(m-xylylene adipamide) is a preferred polyamide due to its availability, high barrier, and processability.

The polyamides are generally prepared by processes which are well known in the art.

Although not necessarily preferred, the polymers of the present invention may also include additives normally used in polymers. Illustrative of such additives known in the art are carbon black, glass fibers, fillers, impact modifiers, antioxidants, stabilizers, flame retardants, reheat aids, crystallization aids, acetaldehyde reducing compounds, recycling release aids, oxygen scavengers, plasticizers, nucleators, mold release agents, compatibilizers, and the like, or their combinations.

All of these additives and many others and their use are known in the art and do not require extensive discussion. Therefore, only a limited number will be referred to, it being understood that any of these compounds can be used in any combination so long as they do not hinder the present invention from accomplishing its objects.

This invention also relates to articles prepared from the nanocomposite material of this invention, including, but not limited to film, fibers, sheet, pipes, tubes, profiles, molded articles, preforms, stretch blow molded films and containers, injection blow molded containers, extrusion blow molded films and containers, thermoformed articles and the like. The containers are preferably bottles. The utility of nanocomposites has been established. The advantages of the nanocomposites of this invention include the preparation of molded articles, films, and fibers with improved appearance. In addition, the colored molded articles, films, and fibers of this invention have excellent light fastness and color stability.

The bottles and containers of this invention may also provide increased shelf storage life for contents, including beverages and food that are sensitive to the permeation of gases. Articles, more preferably containers, of the present invention may display a gas transmission or permeability rate (oxygen, carbon dioxide, water vapor) at least 10% lower (depending on clay concentration) than that of similar containers made from clay-free polymer, resulting in correspondingly longer product shelf life provided by the container. Desirable values for the sidewall modulus and tensile strength may also be maintained.

The articles may also be multilayered. Preferably, the multilayered articles have a nanocomposite material disposed intermediate to other layers, although the nanocomposite may also be one layer of a two-layered article. In embodiments where the nanocomposite and its components are approved for food contact, the nanocomposite may form the food contact layer of the desired articles. In other embodiments it is preferred that the nanocomposite be in a layer other than the food contact layer.

The multilayer articles may also contain one or more layers of the nanocomposite composition of this invention and one or more layers of a structural polymer. A wide variety of structural polymers may be used. Illustrative of structural polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrene, polyethylene-co-vinyl alcohols (EVOH), and the like or their combinations and blends. The preferred structural polymers are polyesters, such as poly(ethylene terephthalate) and its copolymers.

In another embodiment of this invention, the polymer-clay nanocomposite and the molded article or extruded sheet may be formed at the same time by co-injection molding or co-extruding.

Another embodiment of this invention is the combined use of silicate layers uniformly dispersed in the matrix of a high barrier thermoplastic together with the multilayer approach to packaging materials. By using a layered clay, the amount of material that is needed to generate a specific barrier level in the end application is greatly reduced.

Since the high barrier material is often the most expensive component in multilayer packaging, a reduction in the amount of this material used can be quite beneficial. With the nanocomposite layer being sandwiched between two outer polymer layers, the surface roughness is often considerably less than for a monolayer nanocomposite material. Thus, with a multilayer approach, the level of haze is reduced.

EXAMPLES

The following examples are put forth so as to provide those of ordinary skill in the art with a more complete disclosure and description of how the resin compositions claimed herein are made and evaluated. They are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in °C. or is at room temperature and pressure is at or near atmospheric.

The pigments and nanocomposites of this invention are further illustrated by the following examples.

Examples 1

This example demonstrates the preparation of 1,5-bis[2-(morpholin-4-yl)ethylamino]anthraquinone as an example of a preferred dye structure.

A mixture of 1,5-dichloroanthraquinone (62.6 grams, 0.225 moles), 4-(2-aminoethyl)morpholine (120 grams, 0.92 moles), and 2-ethoxyethanol (360 mL) was heated with stirring at reflux for about 15 hours. The reaction mixture was allowed to cool and methanol (100 mL) was added to facilitate stirring. The dark red crystalline solid was collected by filtration, washed with chilled methanol, and dried in air. The yield was 87.2 grams, 83.5% of the theoretical yield. An absorption maximum at 521 nm was observed in the visible light absorption spectrum in N,N-dimethylformamide. Field desorption mass spectroscopy supported the following structure:

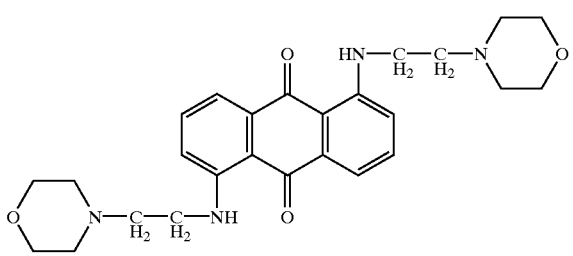

Example 2

This example demonstrates quaternization of the dye from Example 1 as an example of a preferred cation (basic) dye.

A portion (1.50 grams, 0.00323 moles) of the dye of Example 1 was mixed with dimethyl sulfate (10 mL), and the mixture was heated for about 30 minutes with occasional stirring at about 95° C. A semi-solid mass resulted. The reaction mixture was drowned into acetone (100 mL) and the solid was collected by filtration and washed with acetone. The acetone-wet product was added to water (100 ml) and the mixture was stirred to facilitate dissolution. Solid potassium iodide was added to precipitate the quaternary dye, which was collected by filtration, washed with water, and dried in air. The yield was 1.80 g, 74.7% of the theoretical yield, of a dicationic dye having the following proposed structure:

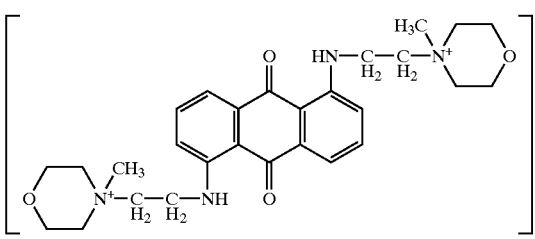

Example 3

This example demonstrates the preparation of a red pigment of this invention.

2.8 grams of sodium montmorillonite with cation exchange capacity of about 0.95 meq/g and 300 ml of water at a temperature of 60° C. were mixed in a Vitamix blender. Into 50 ml of water was dissolved 1.0 grams of the dicationic dye from Example 2. The above solution was added to the Vitamix blender containing the sodium montmorillonite dispersion and mixed. The resulting mixture was filtered, washed with water in the Vitamix blender, filtered, then dried at 60° C. overnight in a vacuum oven then ground to a particle size of less than 100 microns to give 2.7 grams of a red pigment.

Example 4

This example demonstrates the excellent thermal stability of the red pigment of this invention by its ability to withstand the prolonged period at high temperatures required for the preparation of a polyester nanocomposite by an in-situ polymerization process and the preparation of a red polyester nanocomposite of this invention.

Oligomeric PET with number average molecular weight of about 400 g/mol was prepared from dimethyl terephthalate, ethylene glycol, and the appropriate amounts of catalyst solutions to provide 20 ppm Ti, 55 ppm Mn, 80 ppm Co, and 230 ppm Sb. Into a 500-mL round-bottom flask was charged 0.13 grams of the red pigment prepared as described in Example 3, and 25.6 grams of the above oligomeric PET. The flask was equipped with a short condenser and metal stirring rod then given a nitrogen atmosphere.

The flask was heated by a metal bath at 220° C. until the contents formed a red melt, then stirring at 200 rpm was begun, and the metal bath temperature was increased to 280° C. over a period of about 20 minutes, then the appropriate amount of catalyst solution was added to provide 110 ppm of P. The pressure was reduced to less than 0.3 torr over a period of about 10 minutes and held for 60 minutes to effect polycondensation.

During this time the stirring rate was reduced to prevent wrapping of the melt around the stirrer. The metal bath was removed and the flask was allowed to cool. During this time the product crystallize to give a red PET nanocomposite. During polymerization, there was no visible change in the color, the dye did not sublime into the condenser, and the polymer built up normally.

Example 5

This example demonstrates the preparation of a blue pigment of this invention.

5 grams of sodium montmorillonite with cation exchange capacity of about 0.95 meq/g and 500 ml of water at a temperature of 60° C. were mixed in a Vitamix blender. Into 50 ml of water was dissolved 1.71 grams of C. I. Basic Blue 3 of the following formula:

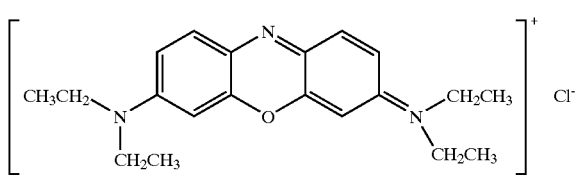

The above solution was added to the Vitamix blender containing the sodium montmorillonite dispersion and mixed. The resulting mixture was filtered, washed with water in the Vitamix blender, filtered, then dried at 60° C.

overnight in a vacuum oven then ground to a particle size of less than 100 microns to give 5.1 grams of a blue pigment with an X-ray diffraction spacing of 1.8 nm.

Example 6

This example demonstrates the preparation of a red pigment of this invention.

10 grams of sodium montmorillonite with cation exchange capacity of about 0.95 meq/g and 500 mL of water at a temperature of 60° C. were mixed in a Vitamix blender. Into 50 ml of water was dissolved 4.55 grams of Rhodamine 6G (C.I. Basic Red 1) of the following formula:

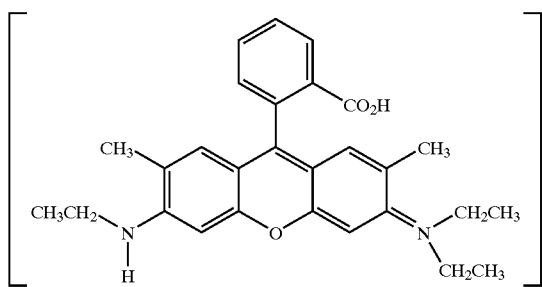

The above solution was added to the Vitamix blender containing the sodium montmorillonite dispersion and mixed. The resulting mixture was filtered, washed with water in the Vitamix blender, filtered, then dried at 60° C. overnight in a vacuum oven then ground to a particle size of less than 100 microns to give 10.0 grams of a red pigment.

Example 7

This example illustrates the method for preparing a red pigment that contains both a cationic colorant and an alkylammonium tether.

Sodium montmorillonite (10 grams, 9.5 milliequivalents, clay supplied by Southern Clay Products and reported to have a cation exchange capacity of 95 milliequivalents/100 grams) was mixed with 490 ml of water at 60° C. in a Vitamix blender to form a 2% by weight slurry of clay in water. Octadecyltrimethylammonium chloride (3.29 grams, 4.75 meq), commercially available as a 50% solution as Arquad 18–50, and Rhodamine 6G (C. I. Basic Red 1) (2.27 grams, 4.74 meq) were dissolved in 50 ml of water then added to the Vitamix blender containing the clay suspension. This mixture was blended at high speed for one minute and the solids formed were removed by filtration on a Buchner funnel. The product was reslurried in 250 ml of water in a Vitamix blender, filtered again, and dried in a circulating air oven at 60° C. for 16 hours then ground to a particle size of less than 100 microns. The product exhibited a basal spacing by X-ray diffraction of 2.6 nanometers.

Example 8

This example illustrates the method for preparing a red pigment that contains both a cationic colorant and an aliphatic polycationic tether.

Sodium montmorillonite (10 grams, 9.5 milliequivalents, clay supplied by Southern Clay Products and reported to have a cation exchange capacity of 95 milliequivalents/100 grams) was mixed with 490 ml of water at 60° C. in a Vitamix blender to form a 2% by weight slurry of clay in water.

Poly(diallyldimethylammonium chloride) (1.55 grams, 1.90 meq) and Rhodamine 6G (C. I. Basic Red 1) (3.64 grams, 7.60 meq) were dissolved in 50 ml of water then added to the Vitamix blender containing the clay suspension. This mixture was blended at high speed for one minute and the solids formed were removed by filtration on a Buchner funnel. The product was reslurried in 250 ml of water in a Vitamix blender, filtered again, and dried in a circulating air oven at 60° C. for 16 hours then ground to a particle size of less than 100 microns. The product exhibited a basal spacing by X-ray diffraction of about 2.4 nanometers.

Example 9

This example illustrates the method for preparing a blue pigment that contains a cationic colorant and two different alkylammonium tethers.

Sodium montmorillonite (10 grams, 9.5 milliequivalents, clay supplied by Southern Clay Products and reported to have a cation exchange capacity of 95 milliequivalents/100 grams) was mixed with 490 ml of water at 60° C. in a Vitamix blender to form a 2% by weight slurry of clay in water. Dodecylammonium chloride (1.00 grams, 4.51 meq), tetramethylammonium chloride (0.494 grams, 4.51 meq), and C. I. Basic Blue 3 (0.170 grams) were dissolved in 50 ml of water then added to the Vitamix blender containing the clay suspension. This mixture was blended at high speed for one minute and the solids formed were removed by filtration on a Buchner funnel. The product was reslurried in 250 ml of water in a Vitamix blender, filtered again, and dried in a circulating air oven at 60° C. for 16 hours then ground to a particle size of less than 100 microns.

Example 10

This example illustrates the method for preparing a clay pigment that contains a cationic optical brightener.

Sodium montmorillonite (10 grams, 9.5 milliequivalents, clay supplied by Southern Clay Products and reported to have a cation exchange capacity of 95 milliequivalents/100 grams) was mixed with 490 ml of water at 60° C. in a Vitamix blender to form a 2% by weight slurry of clay in water. The cationic optical brightener Hostalux NR (aqueous slurry) of the following formula (IV):

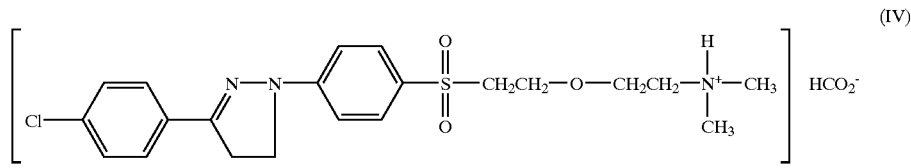

as a 20% solution in water (2.25 grams) was dissolved in 50 ml of water then added to the Vitamix blender containing the clay suspension. This mixture was blended at high speed for one minute and the solids formed were removed by filtration on a Buchner funnel. The product was reslurried in 250 ml of water in a Vitamix blender, filtered again, and dried in a circulating air oven at 60° C. for 16 hours then ground to a particle size of less than 100 microns. The product exhibited a basal spacing by X-ray diffraction of 1.7 nanometers.

Example 11

This example illustrates the method for preparing a clay pigment that contains a cationic optical brightener and an alkyl ammonium tether.

Sodium montmorillonite (10 grams, 9.5 milliequivalents, clay supplied by Southern Clay Products and reported to have a cation exchange capacity of 95 milliequivalents/100 grams) was mixed with 490 ml of water at 60° C. in a Vitamix blender to form a 2% by weight slurry of clay in water. The cationic optical brightener Hostalux NR of formula (IV) (2.03 grams) as a 20% solution in water, and dodecylammonium chloride (2.00 grams) were dissolved in 50 ml of water then added to the Vitamix blender containing the clay suspension. This mixture was blended at high speed for one minute and the solids formed were removed by filtration on a Buchner funnel. The product was reslurried in 250 ml of water in a Vitamix blender, filtered again, and dried in a circulating air oven at 60° C. for 16 hours then ground to a particle size of less than 100 microns. The product exhibited a basal spacing by X-ray diffraction of 1.4 nanometers.

Example 12

This example demonstrates the ability of the blue pigment prepared in Example 3 to withstand the preparation of a polyester nanocomposite by melt compounding.

4 grams of the blue pigment prepared as described in Example 5 is dry mixed with 396 grams PET 9921 of Eastman Chemical Company, which is a polyethylene terephthalate containing about 3.5 mole percent of 1,4-cyclohexane dimethanol and having an I.V. of about 0.72 dL/g. The dry mixture is dried in a vacuum oven overnight at 120° C. then extruded at a temperature of about 275° C. on a Leistritz Micro 18 mm twin screw extruder using general purpose screws with an RPM of 200. The extrudate is quenched into water then pelletized as it exited the die to give a blue polyester nanocomposite.

Example 13

This example demonstrates the use of mixtures of red and blue pigments along with dye-free clay materials to prepare essentially colorless nanocomposites.

1.0 grams of the blue pigment prepared as described in Example 9 and 0.060 grams of the red pigment prepared as described in Example 7 are dry mixed with 399 grams PET 9921 of Eastman Chemical Company, which is a polyethylene terephthalate containing about 3.5 mole percent of 1,4-cyclohexane dimethanol and having an I.V. of about 0.72 dL/g. The dry mixture is dried in a vacuum oven overnight at 120° C. then extruded at a temperature of about 275° C. on a Leistritz Micro 18 mm twin screw extruder using general purpose screws with an RPM of 200. The extrudate is quenched into water then pelletized as it exited the die to give an essentially clear and colorless polyester nanocomposite with much improved appearance compared to the polyester composite prepared in Comparative Example 2.

Example 14

This example demonstrates the use of mixtures of red and blue pigments along with dye-free clay materials to prepare essentially colorless nanocomposites.

1.1 grams of the blue pigment prepared as described in Example 9, 0.066 grams of the red pigment prepared as described in Example 7, and 2.4 grams of Claytone APA, which is an onium ion intercalated montmorillonite available from Southern Clay Products, are dry mixed with 396 grams PET 9921, which is a polyethylene terephthalate containing about 3.5 mole percent of 1,4-cyclohexane dimethanol and having an I.V. of about 0.72 dL/g available from Eastman Chemical Company. The dry mixture is dried in a vacuum oven overnight at 120° C. then extruded at a temperature of about 275° C. on a Leistritz Micro 18 mm twin screw extruder using general purpose screws with an RPM of 200. The extrudate is quenched into water then pelletized as it exited the die to give an essentially clear and colorless polyester nanocomposite with much improved appearance compared to the polyester composite prepared without the pigments of this invention in Comparative Example 2.

Example 15

This example demonstrates the use of mixtures of red and blue pigments along with dye-free clay materials to prepare essentially colorless nanocomposites.

0.080 grams of the blue pigment prepared as described in Example 5, 0.033 grams of the red pigment prepared as described in Example 6, and 3.9 grams of Claytone APA, which is an onium ion intercalated montmorillonite available from Southern Clay Products, are dry mixed with 396 grams PET 9921 of Eastman Chemical Company, which is a polyethylene terephthalate containing about 3.5 mole percent of 1,4-cyclohexane dimethanol and having an I.V. of about 0.72 dL/g. The dry mixture is dried in a vacuum oven overnight at 120° C. then extruded at a temperature of about 275 ° C. on a Leistritz Micro 18 mm twin screw extruder using general purpose screws with an RPM of 200. The extrudate is quenched into water then pelletized as it exited the die to give an essentially clear and colorless polyester nanocomposite with much improved appearance compared to the polyester composite prepared without the pigments of this invention in Comparative Example 2.

Comparative Example 1

This example demonstrates that although the blue pigment prepared in Example 5, which comprises a cationic dye that does not have the preferred structure shown in formula (I), is sufficiently thermally stable to permit use in melt compounding, it is not able to withstand the prolonged period at high temperatures required for the preparation of a polyester nanocomposite by an in-situ polymerization process.

Into a 500-mL round-bottom flask was charged 58.3 grams of dimethyl terephthalate, 37.2 grams of ethylene glycol, 0.30 grams of the blue pigment prepared as described in Example 3, and the appropriate amounts of catalysts to provide 55 ppm Mn, 25 ppm Ti, and 230 ppm Sb. The flask was equipped with a short condenser and metal stirring rod then given a nitrogen atmosphere. The flask was heated by a metal bath at 220° C. for 180 minutes with stirring at 300 rpm under a dynamic nitrogen atmosphere to effect transesterification. During this time, the melt turned black. The metal bath temperature was increased to 280° C. over a period of about 20 minutes, then the appropriate amount of catalyst solution was added to provide 110 ppm of P. The pressure was reduced to about 0.3 torr over a period of about 15 minutes and held for 60 minutes to effect polycondensation. During this time some black material sublimed into the condenser above the flask, and the stirring rate was reduced as the melt viscosity increased. Then the metal bath was removed and the flask was allowed to cool. During this time the product crystallized to give a low molecular weight, dark gray PET nanocomposite.

Comparative Example 2

4 grams of Claytone APA, which is an onium ion intercalated montmorillonite available from Southern Clay Products, is dry mixed with 396 grams PET 9921 of Eastman Chemical Company, which is a polyethylene terephthalate containing about 3.5 mole percent of 1,4-cyclohexane dimethanol and having an I.V. of about 0.72 dL/g. The dry mixture is dried in a vacuum oven overnight at 120° C. then extruded at a temperature of about 275° C. on a Leistritz Micro 18 mm twin screw extruder using general purpose screws with an RPM of 200. The extrudate is quenched into water then pelletized as it exited the die to give a clear but yellow colored polyester nanocomposite.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer-clay nanocomposite comprising:
   (i) a melt-processible matrix polymer, and incorporated therein
   (ii) a colorant composition comprising a clay material intercalated with at least one cationic colorant having a cation group and a chromophore group, wherein the cation group is separated from the chromophore group by at least two carbons.

2. The nanocomposite of claim 1, wherein the melt-processible matrix polymer comprises a polyester, polyetherester, polyamide, polyesteramide, polyurethane, polyimide, polyetherimide, polyurea, polyamideimide, polyphenyleneoxide, phenoxy resin, epoxy resin, polyolefin, polyacrylate, polystyrene, polyethylene-co-vinyl alcohol, or a copolymer thereof or a mixture thereof.

3. The nanocomposite of claim 1, wherein the polymer comprises a partially aromatic polyamide, aliphatic polyamide, wholly aromatic polyamide or a mixture thereof.

4. The nanocomposite of claim 1, wherein the polymer is poly(ethylene terephthalate) or a copolymer thereof.

5. The nanocomposite of claim 1, wherein the clay material is present in an amount of greater than zero to about 25 weight percent based on the total nanocomposite weight.

6. The nanocomposite of claim 1, wherein the clay material is present in an amount of from about 0.5 to about 15 weight percent based on the total nanocomposite weight.

7. The nanocomposite of claim 1, wherein the clay material comprises montmorillonite, saponite, hectorite, mica, vermiculite, bentonite, nontronite, beidellite, volkonskoite, saponite, magadite, kenyaite, or a mixture thereof.

8. The nanocomposite of claim 1, wherein the clay material comprises Wyoming montmorillonite or Wyoming bentonite.

9. The nanocomposite of claim 1, wherein the clay material is a free flowing powder having a cation exchange capacity from about 0.9 to about 1.5 meq/g.

10. The nanocomposite of claim 1, wherein the clay material comprises individual platelet particles having a thickness of less than about 2 nm and a diameter of from about 10 to about 3000 nm.

11. The nanocomposite of claim 1, wherein the cationic colorant is organic.

12. The nanocomposite of claim 1, wherein the cationic colorant is represented by the general formula (I):

$$[A]-(X-R-Y)_n \quad (I)$$

wherein

A is a mono-, di-, tri-, or tetra-valent colorant moiety comprises an anthraquinone, methine, anthrapyridone, triphenodioxazine, fluorindine, phthaloylpyrrocoline, coumarin, phthaloylacridone, 4-amino-1,8-naphthalimidie, thioxanthrone, 2,5-arylaminoterephthalic acid or ester, benzanthrone, 3,6-diaminopyromellitic acid diimide, quinophthalone, naphthalene 1,4,5,8-tetra carboxylic bis-imide; isothiazoloanthrone, anthrapyrimidine, anthrapyrimidone, indanthrone, phthalocyanine, naphthalocyanine, perinone, 3-aryl-2,5-dioxypyrroline, 3,4,9,10-perylenetetracarboxylic acid diimide, or 5-arylidene-2-(5H)furanone;

X is a linking group comprising —O—, —S—, —SO$_2$—, —CO$_2$—, —CON(R$_1$)—, —SO$_2$N(R$_1$)—, N, or a covalent bond, wherein R$_1$ is hydrogen, C$_1$–C$_8$ alkyl, aryl, or C$_5$–C$_7$ cycloalkyl;

R is C$_2$–C$_8$ alkylene or —(C$_2$–C$_8$ alkylene)-[(X—(C$_2$–C$_8$ alkylene)]$_{1-3}$—;

Y is a moiety having the general formula (II):

(II)

wherein

Z$^-$ is a halogen ion; R$_2$ is C$_1$–C$_8$ alkyl or C$_2$–C$_8$ alkenyl; R$_3$ and R$_4$ are independently C$_1$–C$_8$ alkyl, C$_3$–C$_8$ alkenyl, C$_5$–C$_7$ cycloalkyl, or may be combined to produce a moiety having the general formula (III):

(III)

wherein

X$_1$ is a covalent bond, —CH$_2$—, —O—, —S—, —SO$_2$—, or —N(R$_5$)—, wherein R$_5$ is an acyl radical; and n is 1–4.

13. The nanocomposite of claim 1, wherein the cationic colorant is quaternary 1,5-bis[2-(morpholin-4-yl)ethylamino]anthraquinone.

14. The nanocomposite of claim 1, wherein the melt-processible matrix polymer comprises poly(ethylene terephthalate) or a copolymer thereof, the clay material comprises Wyoming montmorillonite or Wyoming bentonite, and the cationic colorant comprises quaternized 1,5-bis[2-(morpholin-4-yl)ethylamino]anthraquinone.

15. The nanocomposite of claim 1, having an I.V. of at least 0.7 dL/g as measured in 60 wt. %/40 wt. % phenol/tetrachloroethane at 25° C.

16. An article prepared from the nanocomposite of claim 1.

17. The article of claim 16 in the form of film, fiber, sheet, pipe, an extruded article, a molded article or a molded container.

18. The article of claim 16 in the form of a bottle.

19. A polymer-clay nanocomposite comprising:
(i) a melt-processible matrix polymer, and incorporated therein
(ii) an optical brightener composition comprising a clay material intercalated with at least one optical brightener having a cation group and a chromophore group,

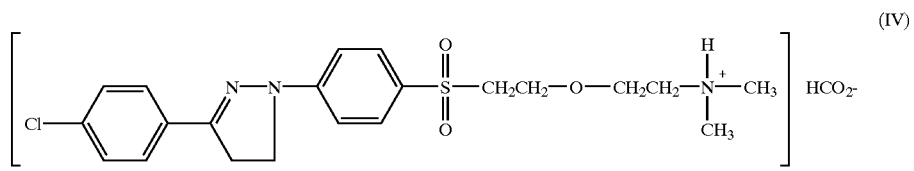

wherein the cation group is separated from the chromophore group by at least two carbons.

20. The nanocomposite of claim 19, wherein the melt-processible matrix polymer comprises a polyester, polyetherester, polyamide, polyesteramide, polyurethane, polyimide, polyetherimide, polyurea, polyamideimide, polyphenyleneoxide, phenoxy resin, epoxy resin, polyolefin, polyacrylate, polystyrene, polyethylene-co-vinyl alcohol, or a copolymer thereof or a mixture thereof.

21. The nanocomposite of claim 19, wherein the polymer is poly(ethylene terephthalate) or a copolymer thereof.

22. The nanocomposite of claim 19, wherein the clay material is present in an amount of greater than zero to about 25 weight percent based on the total nanocomposite weight.

23. The nanocomposite of claim 19, wherein the clay material is present in an amount of from about 0.5 to about 15 weight percent based on the total nanocomposite weight.

24. The nanocomposite of claim 19, wherein the clay material comprises montmorillonite, saponite, hectorite, mica, vermiculite, bentonite, nontronite, beidellite, volkonskoite, saponite, magadite, kenyaite, or a mixture thereof.

25. The nanocomposite of claim 19, wherein the clay material comprises Wyoming montmorillonite or Wyoming bentonite.

26. The nanocomposite of claim 19, wherein the clay material is a free flowing powder having a cation exchange capacity from about 0.9 to about 1.5 meq/g.

27. The nanocomposite of claim 19, wherein the clay material comprises individual platelet particles having a thickness of less than about 2 nm and a diameter of from about 10 to about 3000 nm.

28. The nanocomposite of claim 19, wherein the optical brightener is organic.

29. The nanocomposite of claim 19, wherein the optical brightener comprises a stilbene, styrylbenoxazole, coumarin, benzocoumarin, 1,4-bis(benzoxazolyl-2'-yl)-naphthalone, naphthalimide, a thiophene oxazoic, pyrazoline, or xanthene.

30. The nanocomposite of claim 19, wherein the optical brightener has the formula (IV):

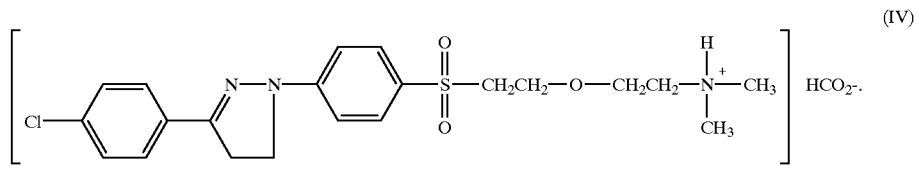

31. The nanocomposite of claim 19, wherein the melt-processible matrix polymer comprises poly(ethylene terephthalate) or a copolymer thereof, the clay material comprises Wyoming montmorillonite or Wyoming bentonite, and the optical brightener has the formula (IV):

32. The nanocomposite of claim 19, having an I.V. of at least 0.7 dL/g as measured in 60 wt. %/40 wt. % phenol/tetrachloroethane at 25° C.

33. An article prepared from the nanocomposite of claim 19.

34. The article of claim 33 in the form of film, fiber, sheet, pipe, an extruded article, a molded article or a molded container.

35. The article of claim 33 in the form of a bottle.

36. A colorant composition comprising:
(i) at least one cationic colorant having a cation group and a chromophore group, wherein the cation group is separated from the chromophore group by at least two carbons, and
(ii) a clay material intercalated with component (i).

37. The composition of claim 36, wherein the cationic colorant is organic.

38. The composition of claim 36, wherein the cationic colorant is represented by the general formula (I):

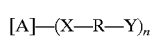

wherein
A is a mono-, di-, tri-, or tetra-valent colorant moiety comprises an anthraquinone, methine, anthrapyridone, triphenodioxazine, fluorindine, phthaloylpyrrocoline, coumarin, phthaloylacridone, 4-amino-1,8-naphthalimide, thioxanthrone, 2,5-arylaminoterephthalic acid or ester, benzanthrone, 3,6-diaminopyromellitic acid diimide, quinophthalone, naphthalene 1,4,5,8-tetra carboxylic bis-imide, isothiazoloanthrone, anthrapyrimidine, anthrapyrimidone, indanthrone, phthalocyanine, naphthalocyanine, perinone, 3-aryl-2,5-dioxypyrroline, 3,4,9,10-perylenetetracarboxylic acid diimide, or 5-arylidene-2-(5H)furanone;

X is a linking group comprising —O—, —S—, —SO$_2$—, —CO$_2$—, —CON(R$_1$)—, —SO$_2$N(R$_1$)—, N, or a covalent bond, wherein R$_1$ is hydrogen, C$_1$–C$_8$ alkyl, aryl, or C$_5$–C$_7$ cycloalkyl;

R is C$_2$–C$_8$ alkylene or —(C$_2$–C$_8$ alkylene)-[(X—(C$_2$–C$_8$ alkylene)]$_{1-3}$—;

Y is a moiety having the general formula (II):

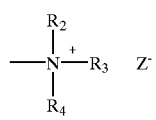
(II)

wherein Z$^-$ is a halogen ion; R$_2$ is C$_1$–C$_8$ alkyl or C$_2$–C$_8$ alkenyl; R$_3$ and R$_4$ are independently C$_1$–C$_8$ alkyl, C$_3$–C$_8$ alkenyl, C$_5$–C$_7$ cycloalkyl, or may be combined to produce a moiety having the general formula (III):

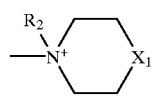
(III)

wherein X$_1$ is a covalent bond, —CH$_2$—, —O—, —S—, —SO$_2$—, or —N(R$_5$)—, wherein R$_5$ is an acyl radical; and n is 1–4.

39. The composition of claim 36, wherein the cationic colorant is quaternary 1,5-bis[2-(morpholin-4-yl) ethylamino]anthraquinone.

40. The composition of claim 36, wherein the clay material comprises montmorillonite, saponite, hectorite, mica, vermiculite, bentonite, nontronite, beidellite, volkonskoite, saponite, magadite, kenyaite, or a mixture thereof.

41. The composition of claim 39, wherein the clay material comprises Wyoming montmorillonite or Wyoming bentonite.

42. The composition of claim 39, wherein the clay material is a free flowing powder having a cation exchange capacity from about 0.9 to about 1.5 meq/g.

43. A composition comprising:
   (i) at least one optical brightener having a cation group and a chromophore group, wherein the cation group is separated from the chromophore group by at least two carbons, and
   (ii) a clay material intercalated with component (i).

44. The composition of claim 43, wherein the optical brightener is organic.

45. The composition of claim 43, wherein the optical brightener comprises a stilbene, styrylbenoxazole, coumarin, benzocoumarin, 1,4-bis(benzoxazolyl-2'-yl)-naphthalone, naphthalimide, a thiophene oxazoic, pyrazoline, or xanthene.

46. The composition of claim 43, wherein the optical brightener has the formula (IV):

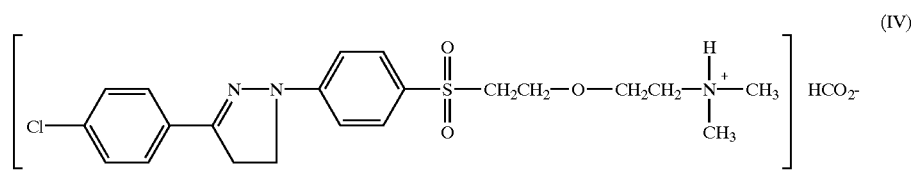
(IV)

47. The composition of claim 43, wherein the clay material comprises montmorillonite, saponite, hectorite, mica, vermiculite, bentonite, nontronite, beidellite, volkonskoite, saponite, magadite, kenyaite, or a mixture thereof.

48. The composition of claim 43, wherein the clay material comprises Wyoming montmorillonite or Wyoming bentonite.

49. The composition of claim 43, wherein the clay material is a free flowing powder having a cation exchange capacity from about 0.9 to about 1.5 meq/g.

50. A process for preparing a polymer-clay nanocomposite comprising:
   (i) preparing an intercalated layered clay material by reacting a swellable layered clay material with a cationic colorant, optical brightener, or a mixture thereof, wherein the cationic colorant or optical brightener has a cation group separated from the chromophore group by at least two carbons, and
   (ii) incorporating the intercalated clay material in a matrix polymer by melt processing the matrix polymer with the intercalated clay.

51. The process of claim 50, wherein step (ii) is conducted by a batch mixing or a melt compounding extrusion process.

52. A polymer-clay nanocomposite made by the process of claim 50.

53. An article prepared from the nanocomposite of claim 52.

54. The article of claim 53 in the form of film, fiber, sheet, pipe, an extruded article, a molded article or a molded container.

55. The article of claim 53 in the form of a bottle.

* * * * *